(12) United States Patent
Hao et al.

(10) Patent No.: US 12,101,043 B2
(45) Date of Patent: Sep. 24, 2024

(54) NEURAL NETWORK AND TORQUE FEEDBACK-BASED CONTROL OF VEHICLE ELECTRIC TRACTION MOTOR

(71) Applicant: GM Global Technology Operations LLC, Detroit, MI (US)

(72) Inventors: Lei Hao, Troy, MI (US); Yue-Yun Wang, Troy, MI (US); Suresh Gopalakrishnan, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 278 days.

(21) Appl. No.: 17/738,567

(22) Filed: May 6, 2022

(65) Prior Publication Data

US 2023/0361707 A1    Nov. 9, 2023

(51) Int. Cl.
*H02P 23/00* (2016.01)
*B60L 15/20* (2006.01)
*G06N 3/08* (2023.01)

(52) U.S. Cl.
CPC .......... *H02P 23/0018* (2013.01); *B60L 15/20* (2013.01); *B60L 2240/421* (2013.01); *B60L 2240/423* (2013.01); *B60L 2240/527* (2013.01); *B60L 2240/529* (2013.01); *G06N 3/08* (2013.01)

(58) Field of Classification Search
CPC ................. H02P 23/0018; B60L 15/20; B60L 2240/421; B60L 2240/423; B60L 2240/527; B60L 2240/529; G06N 3/08
See application file for complete search history.

(56) References Cited

U.S. PATENT DOCUMENTS

| | | | |
|---|---|---|---|
| 2020/0064782 A1* | 2/2020 | Li | G06N 3/08 |
| 2020/0266743 A1* | 8/2020 | Li | H02P 21/0014 |

* cited by examiner

*Primary Examiner* — Zoheb S Imtiaz
(74) *Attorney, Agent, or Firm* — CANTOR COLBURN LLP

(57) ABSTRACT

A system in a vehicle includes a controller to implement a neural network to provide current commands based on inputs. The inputs include a torque input. The system also includes a current controller to provide a three-phase voltage through an inverter based on the current commands from the controller. An electric traction motor provides drive power to a transmission of the vehicle based on injection of the three-phase voltage. The current commands resulting from implementation of the neural network are corrected based on estimated torque resulting from the injection of the three-phase voltage to the electric traction motor.

20 Claims, 3 Drawing Sheets

NEURAL NETWORK AND TORQUE FEEDBACK-BASED CONTROL OF VEHICLE ELECTRIC TRACTION MOTOR

INTRODUCTION

The subject disclosure relates to neural network and torque feedback-based control of a vehicle electric traction motor.

A vehicle (e.g., automobile, truck, construction equipment, farm equipment) that is a battery electric vehicle (BEV) or an electric hybrid vehicle uses a traction motor, which is an electric motor, for propulsion instead of or in addition to an internal combustion engine. The traction motor may be an interior permanent magnet (IPM) motor with magnets embedded in the rotor. As a result, while a surface permanent magnet motor has a permanent magnet attached to the rotor surface and only uses magnetic torque from the magnet, the IPM motor uses reluctance through magnetic resistance in addition to magnetic torque. A torque input (e.g., via an accelerator pedal operated by a driver) is used to convert direct current (DC) from the vehicle battery to an alternating current (AC) to the IPM motor to achieve the torque requested by the torque input. This torque is supplied to the power transfer unit that turns the wheels. Accordingly, it is desirable to provide neural network and torque feedback-based control of a vehicle electric traction motor.

SUMMARY

In one exemplary embodiment, a system in a vehicle includes a controller to implement a neural network to provide current commands based on inputs. The inputs include a torque input. The system also includes a current controller to provide a three-phase voltage through an inverter based on the current commands from the controller. An electric traction motor provides drive power to a transmission of the vehicle based on injection of the three-phase voltage. The current commands resulting from implementation of the neural network are corrected based on estimated torque resulting from the injection of the three-phase voltage to the electric traction motor.

In addition to one or more of the features described herein, the system also includes a first feedback loop based on current measurements at two of three phases of the three-phase voltage provided to the electric traction motor.

In addition to one or more of the features described herein, the current measurements are transformed to direct and quadrature current by a converter and provided to the current controller.

In addition to one or more of the features described herein, the estimated torque resulting from the injection of the three-phase voltage to the electric traction motor is provided in a second feedback loop.

In addition to one or more of the features described herein, the estimated torque is subtracted from the torque input and provided to a proportional integral controller.

In addition to one or more of the features described herein, the current controller obtains reference direct and quadrature currents based on weighting the current commands with output parameters provided by the proportional integral controller and also obtains the quadrature and direct currents of the first feedback loop.

In addition to one or more of the features described herein, the inputs to the controller that implements the neural network include a speed of the electric traction motor.

In addition to one or more of the features described herein, the neural network is a multi-zone neural network with different parameters defined for each zone among a plurality of zones, each zone being defined by a range of values of the torque input and a range of values of the speed of the electric traction motor.

In addition to one or more of the features described herein, the plurality of zones is three or more zones, and at least one of the plurality of zones represents an overlap of two others of the plurality of zones.

In addition to one or more of the features described herein, the controller implements linear interpolation or filtering on the current commands output by the multi-zone neural network.

In another exemplary embodiment, a method of assembling a system in a vehicle includes configuring a controller to implement a neural network to provide current commands based on inputs. The inputs include a torque input. The method also includes configuring a current controller to provide a three-phase voltage through an inverter based on the current commands from the controller, and arranging an electric traction motor to provide drive power to a transmission of the vehicle based on injection of the three-phase voltage. The current commands resulting from implementation of the neural network are corrected based on estimated torque resulting from the injection of the three-phase voltage to the electric traction motor.

In addition to one or more of the features described herein, the method also includes arranging a first feedback loop based on current measurements at two of three phases of the three-phase voltage provided to the electric traction motor.

In addition to one or more of the features described herein, the method also includes arranging a converter to transform the current measurements to direct and quadrature current and providing the direct and quadrature current to the current controller.

In addition to one or more of the features described herein, the method also includes arranging a second feedback loop and providing the estimated torque resulting from the injection of the three-phase voltage to the electric traction motor in the second feedback loop.

In addition to one or more of the features described herein, the method also includes arranging a proportional integral controller to receive a result of subtracting the estimated torque from the torque input.

In addition to one or more of the features described herein, the configuring the current controller includes the current controller obtaining reference direct and quadrature currents based on weighting the current commands with output parameters provided by the proportional integral controller and also obtaining the quadrature and direct currents of the first feedback loop.

In addition to one or more of the features described herein, the inputs to the controller that implements the neural network include a speed of the electric traction motor.

In addition to one or more of the features described herein, the configuring the controller to implement the neural network includes the controller implementing a multi-zone neural network with different parameters defined for each zone among a plurality of zones, each zone being defined by a range of values of the torque input and a range of values of the speed of the electric traction motor.

In addition to one or more of the features described herein, the plurality of zones is three or more zones, and at least one of the plurality of zones represents an overlap of two others of the plurality of zones.

In addition to one or more of the features described herein, the configuring the controller includes the controller implementing linear interpolation or filtering on the current commands output by the multi-zone neural network.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
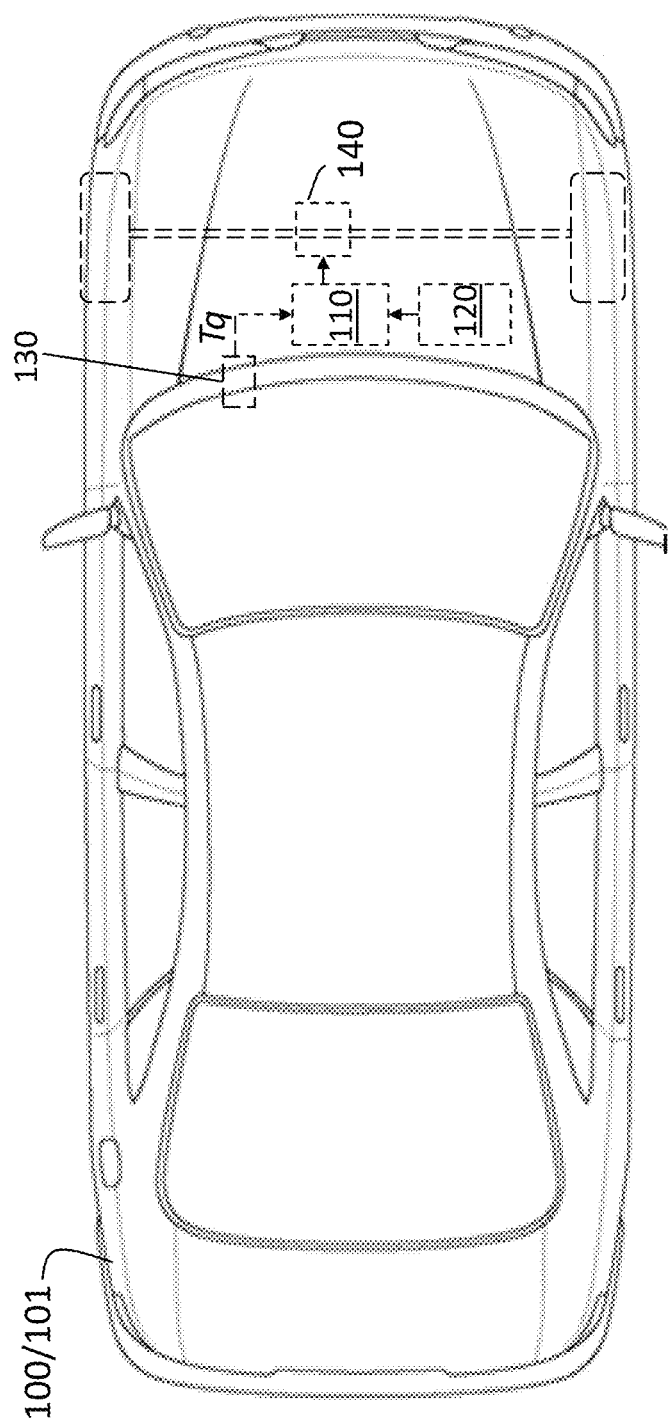
FIG. 1 is a block diagram of a vehicle with neural network and torque feedback-based control of a vehicle electric traction motor according to one or more embodiments.

The following description is merely exemplary in nature and is not intended to limit the present disclosure, its application or uses. It should be understood that throughout the drawings, corresponding reference numerals indicate like or corresponding parts and features.

Embodiments of the systems and methods detailed herein relate to neural network and torque feedback-based control of a vehicle electric traction motor. A prior approach involved the use of look-up tables to convert a torque input to current signals used to control the electric motor. According to one or more embodiments, a deep learning neural network is used instead. More specifically, a neural network-based approach is combined with a torque feedback loop. That is, the torque generated by the electric motor is obtained as feedback and proportional integral (PI) control, for example, is used on this feedback, as detailed. The combination of a neural network and torque feedback loop allows a less complex neural network (i.e., fewer layers and nodes) to be used while obtaining higher accuracy than would otherwise be possible with the neural network alone and also allows a neural network-based approach in an automotive application. This is because the torque feedback loop facilitates correction of the output of the less complex neural network, while the lower complexity ensures that the resources used by the neural network are compatible with an automotive application. The neural network may be a multi-zone neural network that uses different parameters in different operational zones of the vehicle.

Figure 2:
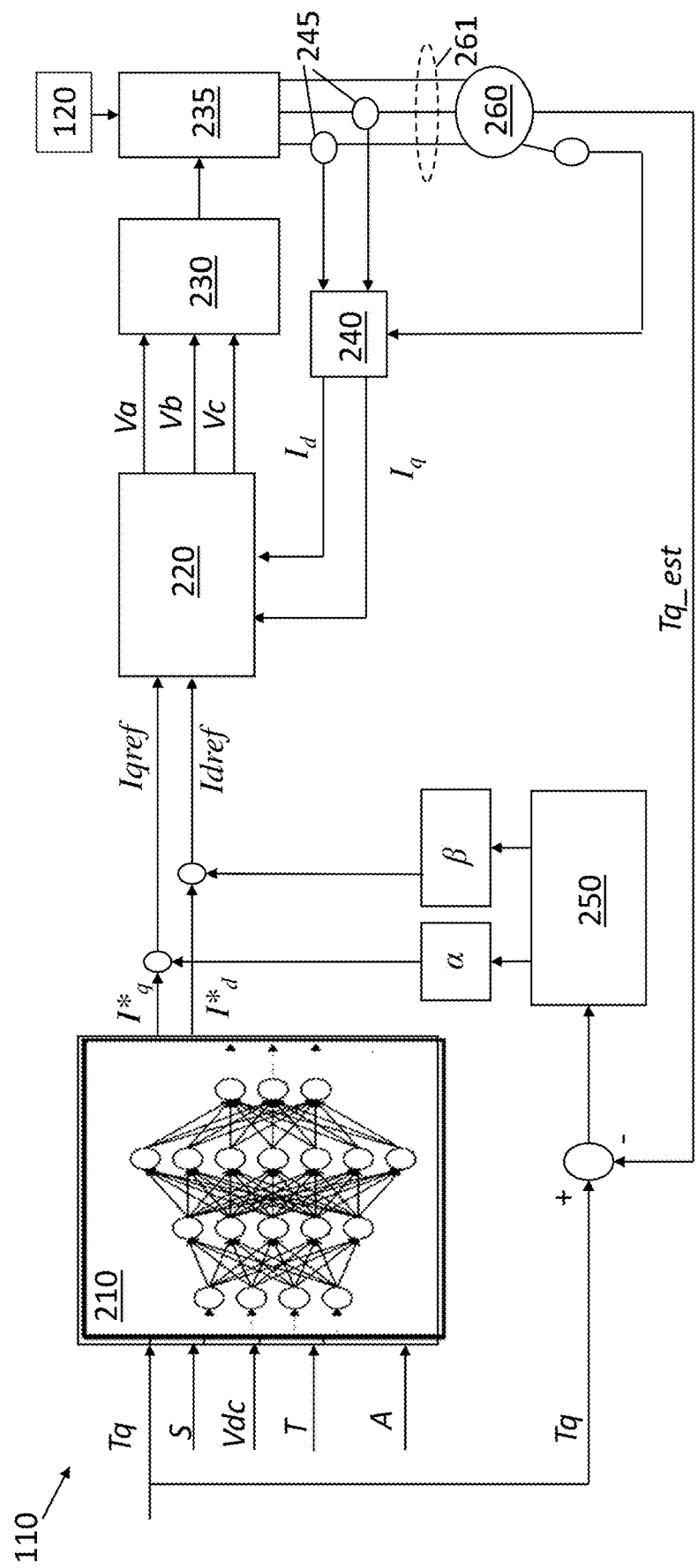
FIG. 2 is a block diagram detailing aspects of the electric traction system, which includes neural network and torque feedback-based control according to one or more embodiments.

In accordance with an exemplary embodiment, FIG. 1 is a block diagram of a vehicle 100 with neural network and torque feedback-based control of a vehicle electric traction motor 260 (FIG. 2). The exemplary vehicle 100 shown in FIG. 1 is an automobile 101. An electric traction system 110, which includes the electric traction motor 260 (e.g., IPM), is coupled to a battery 120 that supplies DC and to a transmission 140, which transfers power to the drive wheels. The transmission 140 may be a hybrid transmission in the case of a gas-electric hybrid vehicle 100. The electric traction system 110 receives a torque input Tq originating from an input source 130 (e.g., accelerator pedal 130 in a driver-operated vehicle 100).

FIG. 2 is a block diagram detailing aspects of the electric traction system 110, which includes neural network and torque feedback-based control according to one or more embodiments. The torque input Tq (i.e., torque command) is provided to a controller 210 that generates direct-axis d and quadrature-axis q current commands $I^*_d$ and $I^*_q$, respectively. The controller 210 may implement a deep learning neural network that obtains additional inputs including speed S of the electric traction motor 260 in rotations per minute (rpm), for example, battery voltage Vdc, and temperature T of the electric traction motor 260. Additional inputs A may include variation of motor parameters and other parameters which affect motor torque. An exemplary neural network implemented by the controller 210 may be a four-layer deep learning neural network. The net definition (i.e., number of nodes per layer) of the four-layer deep learning neural network may be (30, 60, 10, 2). The neural network may be trained with simulated data and further tuned with test data. The neural network may implement continuous learning.

As discussed with reference to FIG. 3, the neural network implemented by the controller 210 may be a multi-zone neural network that learns different parameters in different operating zones or modes of the vehicle 100. According to exemplary embodiments, the controller 210 may include processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

The current commands $I^*_d$ and $I^*_q$ output by the controller 210 are combined with (i.e., respectively added to or weighted by) calibration parameters α and β, output by a PI controller 250 to provide reference currents Iqref and Idref. These reference currents Iqref and Idref are input to a current controller 220 along with feedback currents $I_d$ and $I_q$. The current controller 220 outputs a three-phase voltage Va, Vb, Vc. According to exemplary embodiments, the current controller 220 has two internal PI controller-based control loops, one for $I_d$ and one for $I_q$. Each PI controller takes the current error (i.e., (Iqref-$I_q$) and (Idref-$I_d$)) as input and outputs Vd and Vq, the direct-axis and quadrature-axis voltage commands. The two PI controllers inside the current controller 220 may have a separate set of proportional and integral gains and may use additional cross coupling terms to make the current controller 220 robust. From the direct-axis and quadrature-axis voltage commands, Vd and Vq, the actual voltage commands (i.e., three-phase voltage Va, Vb and Vc) are generated using an inverse park transformation. From the three-phase voltage Va, Vb and Vd, the controller 210 determines the duty cycle to be applied to the switches in the inverter phases.

That is, based on this three-phase voltage Va, Vb, Vc, a pulse width modulator (PWM) 230 controls the switches of an inverter 235 that is supplied with DC from the battery 120 to produce three-phase AC voltage 261 that is supplied to the electric traction motor 260. Based on application of the three-phase AC voltage 261 through the inverter 235, the electric traction motor 260 provides drive power to the transmission 140 of the vehicle 100. Current sensors 245 at two of the three phases supply a converter 240 that produces the feedback currents $I_d$ and $I_q$. The converter 240 is also supplied with values of the rotor speed ωr and shaft position θr of the electric traction motor 260. The converter 240 may be implemented by a processor (e.g., controller 210) and implements a mathematical transform to convert the two phases of the three-phase AC voltage 261 to DC feedback currents $I_d$ and $I_q$.

The estimated (or measured) torque Tq_est from the electric traction motor 260 is provided as a second feedback loop. This estimated torque Tq_est is subtracted from the torque input Tq, as indicated, and the result (i.e., the difference in the desired torque input Tq and the obtained estimated torque Tq_est) is provided to a PI controller 250. The known proportional and integral controller outputs the previously noted calibration parameters α and β that weight the current commands $I^*_d$ and $I^*_q$ output by the controller 210.

As previously noted, the weighting provided by the PI controller 250 acts as a correction for the current commands $I^*_d$ and $I^*_q$ that are output by the neural network implemented by the controller 210. This correction based on the second feedback loop allows the neural network to be less complex than would otherwise be required to obtain the same level of accuracy in the resulting reference currents Iqref and Idref. Additionally, the combination of the neural network implemented by the controller 210 and the PI controller 250 may facilitate diagnosis of the electric traction system 110. For example, by monitoring the amount of correction of the neural network output that is provided by the PI controller 250 (e.g., if |Iqref−$I^*_q$| or |Idref−$I^*_d$| exceeds a predefined threshold), a problem in the electric traction system 110 may be detected.

Figure 4:
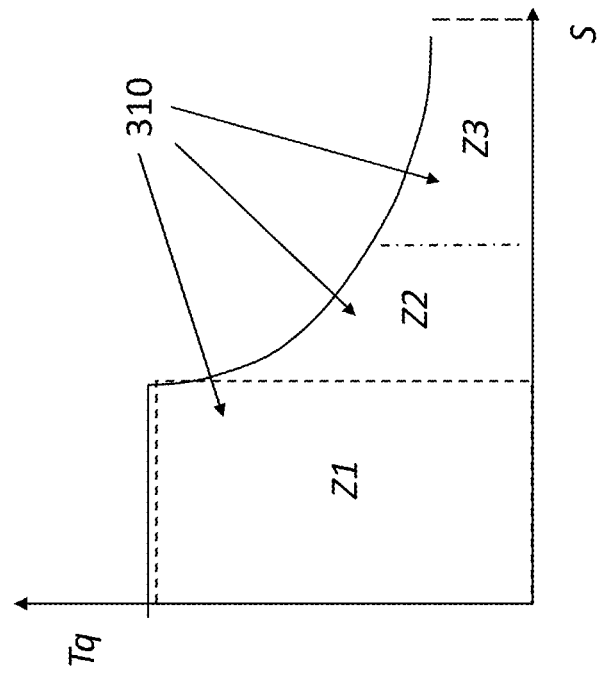
FIG. 4 illustrates exemplary zones associated with a multi-zone neural network used for neural network and torque feedback-based control of a vehicle electric traction motor according to one or more embodiments.
Figure 3:
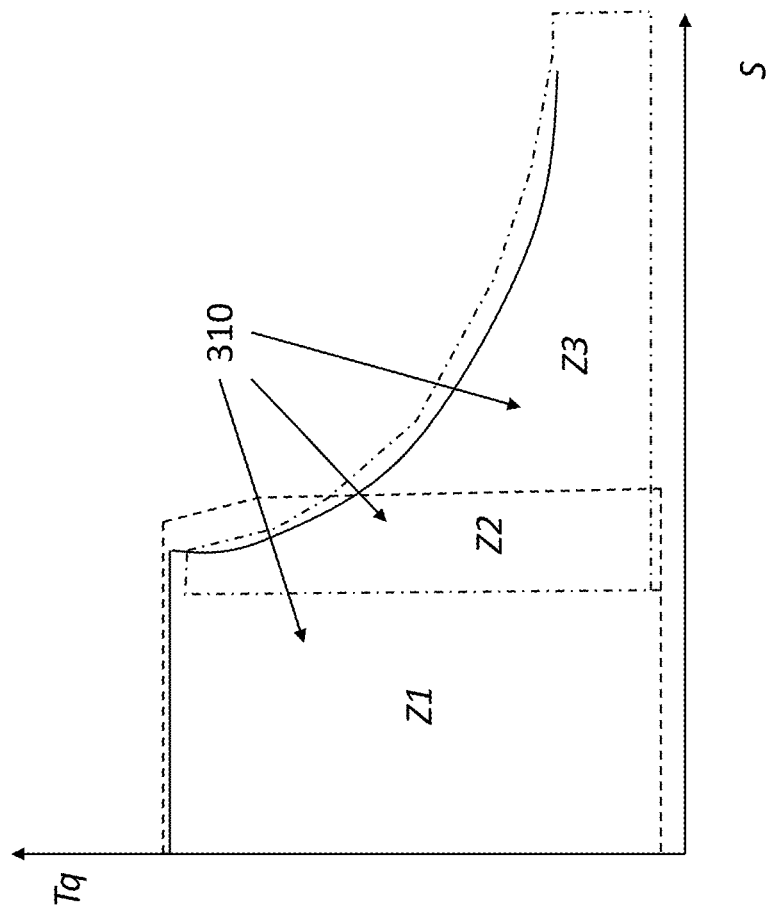
FIG. 3 illustrates exemplary overlapping zones associated with a multi-zone neural network used for neural network and torque feedback-based control of a vehicle electric traction motor according to one or more embodiments.

FIGS. 3 and 4 illustrate exemplary zones 310 associated with a multi-zone neural network used for neural network and torque feedback-based control of a vehicle electric traction motor according to one or more embodiments. As shown, FIGS. 3 and 4 indicate speed S of the electric traction motor 260 in rotations per minute (rpm), for example, along one axis and torque input Tq along a perpendicular axis. FIG. 3 illustrates exemplary zones 310 that overlap, while FIG. 4 illustrates zones 310 that do not overlap. The direct and quadrature current setpoint determination (used to output current commands $I^*_d$ and $I^*_q$) is based on the zone 310 in which the vehicle 100 is operating. Indicated as Z1, Z2, and Z3, the three exemplary zones 310 shown in FIG. 3 are defined by the speed S of the electric traction motor 260 and the torque input Tq. For example, the Z1 zone 310 is defined by a constant torque input Tq for increasing speed S of the electric traction motor 260. The Z2 zone 310 represents an overlap of Z1 and Z3.

With DNNT1 representing the parameters of the multi-zone neural network in the Z1 zone 310 and DNNT2 representing the parameters of the multi-zone neural network in the Z3 zone 310, the parameters of the multi-zone neural network used in the overlap Z2 zone 310 may be weighted according to γ*DNNT1+(1−γ)*DNNT2. That is, the parameters in the overlap Z2 zone 310 may be weighted according to a proximity γ to the Z1 zone 310. The controller 210 may implement a liner interpolation or filtering method to the current commands $I^*_d$ and $I^*_q$ provided by the neural network in order to smooth the resulting reference currents Iqref and Idref that are input to the current controller 220.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A system in a vehicle comprising:
   a controller configured to implement a neural network to provide current commands based on inputs, wherein the inputs include a torque input;
   a current controller configured to provide a three-phase voltage through an inverter based on the current commands from the controller; and
   an electric traction motor configured to provide drive power to a transmission of the vehicle based on injection of the three-phase voltage, wherein the current commands resulting from implementation of the neural network are corrected based on estimated torque resulting from the injection of the three-phase voltage to the electric traction motor,
   a first feedback loop based on current measurements at two of three phases of the three-phase voltage provided to the electric traction motor, wherein the estimated torque resulting from the injection of the three-phase voltage to the electric traction motor is provided in a second feedback loop.

2. The system according to claim 1, wherein the current measurements are transformed to direct and quadrature current by a converter and provided to the current controller.

3. The system according to claim 2, wherein the estimated torque is subtracted from the torque input and provided to a proportional integral controller.

4. The system according to claim 3, wherein the current controller obtains reference direct and quadrature currents based on weighting the current commands with output parameters provided by the proportional integral controller and also obtains the quadrature and direct currents of the first feedback loop.

5. The system according to claim 1, wherein the inputs to the controller that implements the neural network include a speed of the electric traction motor.

6. The system according to claim 5, wherein the neural network is a multi-zone neural network with different parameters defined for each zone among a plurality of zones, each zone being defined by a range of values of the torque input and a range of values of the speed of the electric traction motor.

7. The system according to claim 6, wherein the plurality of zones is three or more zones, and at least one of the plurality of zones represents an overlap of two others of the plurality of zones.

8. The system according to claim 6, wherein the controller is further configured to implement linear interpolation or filtering on the current commands output by the multi-zone neural network.

9. A method of assembling a system in a vehicle, the method comprising:
   configuring a controller to implement a neural network to provide current commands based on inputs, wherein the inputs include a torque input;
   configuring a current controller to provide a three-phase voltage through an inverter based on the current commands from the controller;

arranging an electric traction motor to provide drive power to a transmission of the vehicle based on injection of the three-phase voltage;

correcting the current commands resulting from implementation of the neural network based on estimated torque resulting from the injection of the three-phase voltage to the electric traction motor; and arranging a first feedback loop based on current measurements at two of three phases of the three-phase voltage provided to the electric traction motor, wherein the estimated torque resulting from the injection of the three-phase voltage to the electric traction motor is provided in a second feedback loop.

10. The method according to claim 9, further comprising arranging a converter to transform the current measurements to direct and quadrature current and providing the direct and quadrature current to the current controller.

11. The method according to claim 10, further comprising arranging a proportional integral controller to receive a result of subtracting the estimated torque from the torque input.

12. The method according to claim 11, wherein the configuring the current controller includes the current controller obtaining reference direct and quadrature currents based on weighting the current commands with output parameters provided by the proportional integral controller and also obtaining the quadrature and direct currents of the first feedback loop.

13. The method according to claim 9, wherein the inputs to the controller that implements the neural network include a speed of the electric traction motor.

14. The method according to claim 13, wherein the configuring the controller to implement the neural network includes the controller implementing a multi-zone neural network with different parameters defined for each zone among a plurality of zones, each zone being defined by a range of values of the torque input and a range of values of the speed of the electric traction motor.

15. The method according to claim 14, wherein the plurality of zones is three or more zones, and at least one of the plurality of zones represents an overlap of two others of the plurality of zones.

16. The method according to claim 14, wherein the configuring the controller includes the controller implementing linear interpolation or filtering on the current commands output by the multi-zone neural network.

17. The system according to claim 5, wherein the inputs to the controller that implements the neural network further include a battery voltage.

18. The system according to claim 5, wherein the inputs to the controller that implements the neural network further include a temperate of the electronic traction motor.

19. The method according to claim 13, wherein the inputs to the controller that implements the neural network further include a battery voltage.

20. The method according to claim 13, wherein the inputs to the controller that implements the neural network further include a temperate of the electronic traction motor.

* * * * *